(12) United States Patent
Tadachi et al.

(10) Patent No.: US 10,525,719 B2
(45) Date of Patent: Jan. 7, 2020

(54) VALVE UNIT, LIQUID EJECTING HEAD, LIQUID EJECTING APPARATUS, METHOD OF PRODUCING VALVE UNIT, METHOD OF PRODUCING LIQUID EJECTING HEAD, AND METHOD OF PRODUCING LIQUID EJECTING APPARATUS

(71) Applicant: SEIKO EPSON CORPORATION, Tokyo (JP)

(72) Inventors: Kei Tadachi, Suwa (JP); Satoshi Nagatoya, Azumino (JP); Hiroyuki Tsuchiya, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/922,398

(22) Filed: Mar. 15, 2018

(65) Prior Publication Data

US 2018/0272736 A1    Sep. 27, 2018

(30) Foreign Application Priority Data

Mar. 24, 2017    (JP) ................................. 2017-058699

(51) Int. Cl.
*B41J 2/175*    (2006.01)
*F16J 15/00*    (2006.01)
(Continued)

(52) U.S. Cl.
CPC ............ *B41J 2/17596* (2013.01); *B05D 5/00* (2013.01); *B29C 70/80* (2013.01); *F16J 15/00* (2013.01);
(Continued)

(58) Field of Classification Search
CPC .. B41J 2/17513; B41J 2/17596; B41J 2/1752; B41J 2/17523; B41J 2/17509; B41J 2/175; B41J 2/17503; B41J 2202/05; B41J 2202/22; B05D 5/00; F16J 15/00; B29C 70/80
(Continued)

(56) References Cited

U.S. PATENT DOCUMENTS

2008/0153986 A1    6/2008  Maeda et al.
2012/0114785 A1*   5/2012  Berg ...................... B29C 45/52
                                                    425/564
(Continued)

FOREIGN PATENT DOCUMENTS

CN    101080463 A    11/2007
CN    101328980 A    12/2008
(Continued)

*Primary Examiner* — Jannelle M Lebron
(74) *Attorney, Agent, or Firm* — Workman Nydegger

(57) ABSTRACT

A valve unit includes a flow path member having an opening surface that has a flow path opening of a liquid flow path, a valve having a sealing surface configured to seal the flow path opening, and a sealing member disposed on one of a peripheral portion of the flow path opening in the opening surface and a portion of the sealing surface facing the peripheral portion. The sealing surface is configured to be moved forward and backward relative to the opening surface to open and close the flow path opening. The sealing member is configured to be in contact with the peripheral portion of the flow path opening and the sealing surface when the valve is closed. The sealing member includes a fluorinated polyether.

14 Claims, 9 Drawing Sheets

(51) Int. Cl.
  *B29C 70/80*   (2006.01)
  *B05D 5/00*   (2006.01)
(52) U.S. Cl.
  CPC ........ *B41J 2202/05* (2013.01); *B41J 2202/22* (2013.01)
(58) Field of Classification Search
  USPC .......................................... 347/6, 20, 84, 85
  See application file for complete search history.

(56) References Cited

U.S. PATENT DOCUMENTS

| | | |
|---|---|---|
| 2012/0194608 A1 | 8/2012 | Matsumoto et al. |
| 2013/0161422 A1 | 6/2013 | Miyajima et al. |
| 2015/0321479 A1 | 11/2015 | Matsumoto et al. |
| 2016/0257126 A1* | 9/2016 | Ishida .................. B41J 2/17596 |

FOREIGN PATENT DOCUMENTS

| | | |
|---|---|---|
| CN | 104559765 A | 4/2015 |
| JP | 2012-158002 A | 8/2012 |
| JP | 2013-132894 A | 7/2013 |
| JP | 2014181809 A | 9/2014 |

* cited by examiner

VALVE UNIT, LIQUID EJECTING HEAD, LIQUID EJECTING APPARATUS, METHOD OF PRODUCING VALVE UNIT, METHOD OF PRODUCING LIQUID EJECTING HEAD, AND METHOD OF PRODUCING LIQUID EJECTING APPARATUS

BACKGROUND

1. Technical Field

The present invention relates to a valve unit used in a liquid ejecting apparatus such as an ink jet recording apparatus, a liquid ejecting head, a liquid ejecting apparatus, a method of producing a valve unit, a method of producing a liquid ejecting head, and a method of producing a liquid ejecting apparatus, and more particularly, to a valve unit having higher sealing properties, a liquid ejecting head, a liquid ejecting apparatus, a method of producing a valve unit, a method of producing a liquid ejecting head, and a method of producing a liquid ejecting apparatus.

2. Related Art

In some cases, a liquid ejecting apparatus includes a regulating valve, which keeps a supply pressure of a liquid at a constant value, in a liquid flow path extending from a liquid supply member to a nozzle of a liquid ejecting head. For example, a printer disclosed in JP-A-2013-132894 includes a valve element configured to open and close a communication passage in communication with two chambers of the liquid flow path (a pressure chamber and a valve element housing chamber). The valve element (valve) includes a sealing member formed of an elastic material including a water-repellent resin. When the valve is closed, the sealing member is in close contact with the peripheral portion of the opening of the communication passage to close the communication passage. The water-repellent resin is eluted from the sealing member when the valve is closed, suppressing accumulation of liquid on the peripheral portion of the opening. Thus, the sealing properties are less likely to be deteriorated. JP-A-2013-132894 discloses that a shaft and a flange portion (hereinafter, referred to as a valve body), which are formed of a synthetic resin, and the sealing member are produced as separate members and connected to each other, or the valve body and the sealing member are integrally produced by a double molding technology.

SUMMARY

Although the valve body and the sealing member may be integrally formed by the double molding as described above, if the water-repellent resin is eluted from the sealing member, the water-repellent properties of the sealing member gradually decreases. This lowers flexibility of the sealing member and causes the sealing member to be swollen by the liquid, leading to a reduction in the connection strength between the sealing member and the valve body. Thus, the sealing member may be detached from the valve body, and the sealing properties may be lost. In recent years, a liquid ejecting head is used for ejecting various kinds of liquid having different compositions. For example, an organic solvent based liquid including an organic solvent as a solvent is used in some cases. The employment of the organic solvent liquid makes the water-repellent resin to be more readily eluted from the sealing member, increasing the risk of detachment of the sealing member due to swelling and leading to a shorter service life of the valve. In addition, if the valve body and the sealing member are integrally formed by the double molding, it is difficult to perform a step of improving the connection strength between the valve body and the sealing member, such as a step of applying a primer. The apparatus may be required to have a complex structure.

An advantage of some aspects of the invention is that a valve unit including a valve having higher sealing properties, a liquid ejecting head, a liquid ejecting apparatus, a method of producing a valve unit, a method of producing a liquid ejecting head, and a method of producing a liquid ejecting apparatus are provided.

A valve unit according to a first aspect of the invention includes a flow path member having an opening surface that has a flow path opening of a liquid flow path, a valve having a sealing surface configured to seal the flow path opening, and a sealing member disposed on one of a peripheral portion of the flow path opening in the opening surface and a portion of the sealing surface facing the peripheral portion. The sealing surface is configured to be moved forward and backward relative to the opening surface to open and close the flow path opening. The sealing member is configured to be in contact with the peripheral portion of the flow path opening and the sealing surface when the valve is closed. The sealing member includes a fluorinated polyether.

According to the first aspect of the invention, since the sealing member includes a fluorinated polyether, liquid-repellent properties of the sealing member to any kind of liquid flowing through the liquid flow path are less likely to be lowered. Thus, the sealing member is less likely to be swollen by liquid, and thus the sealing member is less likely to be detached from a sealing member arrangement portion. This leads to an improvement in the sealing properties and durability.

In the above-described configuration, the valve unit may further include a primer layer between a base member of the portion where the sealing member is disposed and the sealing member.

In this configuration, the primer layer disposed between the base member of the portion where the sealing member is disposed and the sealing member improves the connection strength therebetween. Thus, the sealing member is further less likely to be detached from the base member.

In the above-described configuration, the base member may contain hydroxyl groups, and the primer layer may have silicon-hydroxy groups bonds and carbon-carbon double bonds.

In this configuration, the hydroxyl groups in the base member and the silicon-hydroxy group bonds in the primer layer react to each other, and thus the primer layer strongly connected to the base member is obtained.

In the primer layer having the above-described configuration, the carbon-carbon double bonds may be present in a large amount at a position adjacent to the sealing member including silicon-hydrogen bonds and carbon-carbon double bonds.

In this configuration, since the number of carbon-carbon double bonds reacting with the silicon-hydrogen bonds in the sealing member increases toward the sealing member, the connection strength between the primer layer and the sealing member increases.

In the above-described configuration, the base member may have a recess at a sealing member arrangement portion where the sealing member is disposed, and a portion of the sealing member may be positioned in the recess.

According to this configuration, the portion of the sealing member in the recess functions as an anchor, increasing the connection strength between the sealing member and the valve body.

The above-described configuration may further include a protrusion on a sealing member arrangement portion of the base member where the sealing member is disposed. The protrusion may have a base extending upward from the sealing member arrangement portion and an overhanging portion having a larger width than the base. The sealing member may cover the protrusion.

In this configuration, since the sealing member covers the protrusion, the overhanging portion of the protrusion functions as a retainer. This increases the connection strength between the sealing member and the base member.

Furthermore, a liquid ejecting head according to a second aspect of the invention includes the valve unit according to any one of the above-described configurations. The liquid ejecting head is configured to eject liquid supplied from the valve unit.

According to the second aspect, since the liquid ejecting head includes the valve unit including a valve having higher sealing properties and higher durability, the liquid ejecting head has reliability over a longer period of time.

Furthermore, a liquid ejecting apparatus according to a third aspect of the invention includes the valve unit according to any one of the above-described configurations. The liquid ejecting apparatus is configured to eject liquid supplied from the valve unit.

According to the third aspect of the invention, since the liquid ejecting apparatus includes the valve unit including the valve having higher sealing properties and higher durability, the liquid ejecting apparatus has reliability over a longer period of time.

A method of producing a valve unit according to a fourth aspect of the invention is a method of producing a valve unit including a flow path member having an opening surface that has a flow path opening of a liquid flow path, a valve having a sealing surface configured to seal the flow path opening, and a sealing member disposed on one of a peripheral portion of the flow path opening in the opening surface and a portion of the sealing surface facing the peripheral portion. The sealing surface is configured to be moved forward and backward relative to the opening surface to open and close the flow path opening. The sealing member is configured to be in contact with the peripheral portion of the flow path opening and the sealing surface when the valve is closed. The method includes forming a primer layer on a base member of a portion where the sealing member is disposed, and forming the sealing member by insert molding on the base member with the primer layer therebetween.

According to the fourth aspect of the invention, since the valve integrally including the sealing member and the base member is produced by the insert molding, the step of forming the primer layer on the base member is able to be performed before the integration. Thus, the connection strength between the sealing member and the base member is increased without requiring an apparatus having a complex structure.

In the above-described method, the sealing member may include a fluorinated polyether.

According to the configuration, since the sealing member includes a fluorinated polyether, liquid-repellent properties of the sealing member to any kind of liquid flowing through the liquid flow path are less likely to be lowered. Thus, the sealing member is less likely to be swollen by liquid, and thus the sealing member is less likely to be detached from the base member. This leads to an improvement in the sealing properties and durability.

In the above-described method, the base member may contain hydroxyl groups, and the base member may be subjected to a surface treatment with a molecule having silicon-hydroxy group bonds and carbon-carbon double bonds in the step of forming a primer layer.

According to the method, the hydroxyl groups in the base member and the silicon-hydroxyl group bonds in the primer layer react to each other, and thus the primer layer strongly bonded to the base member is obtained.

In the above-described method, the sealing member may have silicon-hydrogen bonds and carbon-carbon double bonds, and the base member after the surface treatment may be further subjected to a surface treatment with molecules having silicon-hydrogen bonds and carbon-carbon double bonds in the step of forming a primer layer.

According to the method, the primer layer includes the carbon-carbon double bonds and the silicon-hydrogen bonds, which respectively react with the silicon-hydrogen bonds and the carbon-carbon double bonds in the sealing member. This increases the connection strength between the primer layer and the sealing member.

Furthermore, a method of producing a liquid ejecting head according to a fifth aspect of the invention is a method of producing a liquid ejecting head configured to eject liquid supplied from a valve unit. The valve unit is produced by the method of producing a valve unit according to any one of the above-described methods.

Furthermore, a method of producing a liquid ejecting apparatus according to a sixth aspect of the invention is a method of producing a liquid ejecting apparatus including a liquid ejecting head configured to eject liquid and a valve unit configured to supply the liquid from a liquid supply source to the liquid ejecting head. The valve unit is produced by the method of producing a valve unit according to any one of the above-described methods.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the present invention is described with reference to the attached drawings. Although various limitations are made in the embodiments described below in order to illustrate specific preferred examples of the invention, it should be noted that the scope of the invention is not limited to these features unless such limitations are explicitly mentioned to limit the invention in the following description. In the following description, an ink jet printer 1 (hereinafter, referred to as a printer) including an ink jet recording head 10 (hereinafter, referred to as a recording head), which is one example of a liquid ejecting head, is described as a liquid ejecting apparatus including a valve unit according to the invention.

Figure 1:
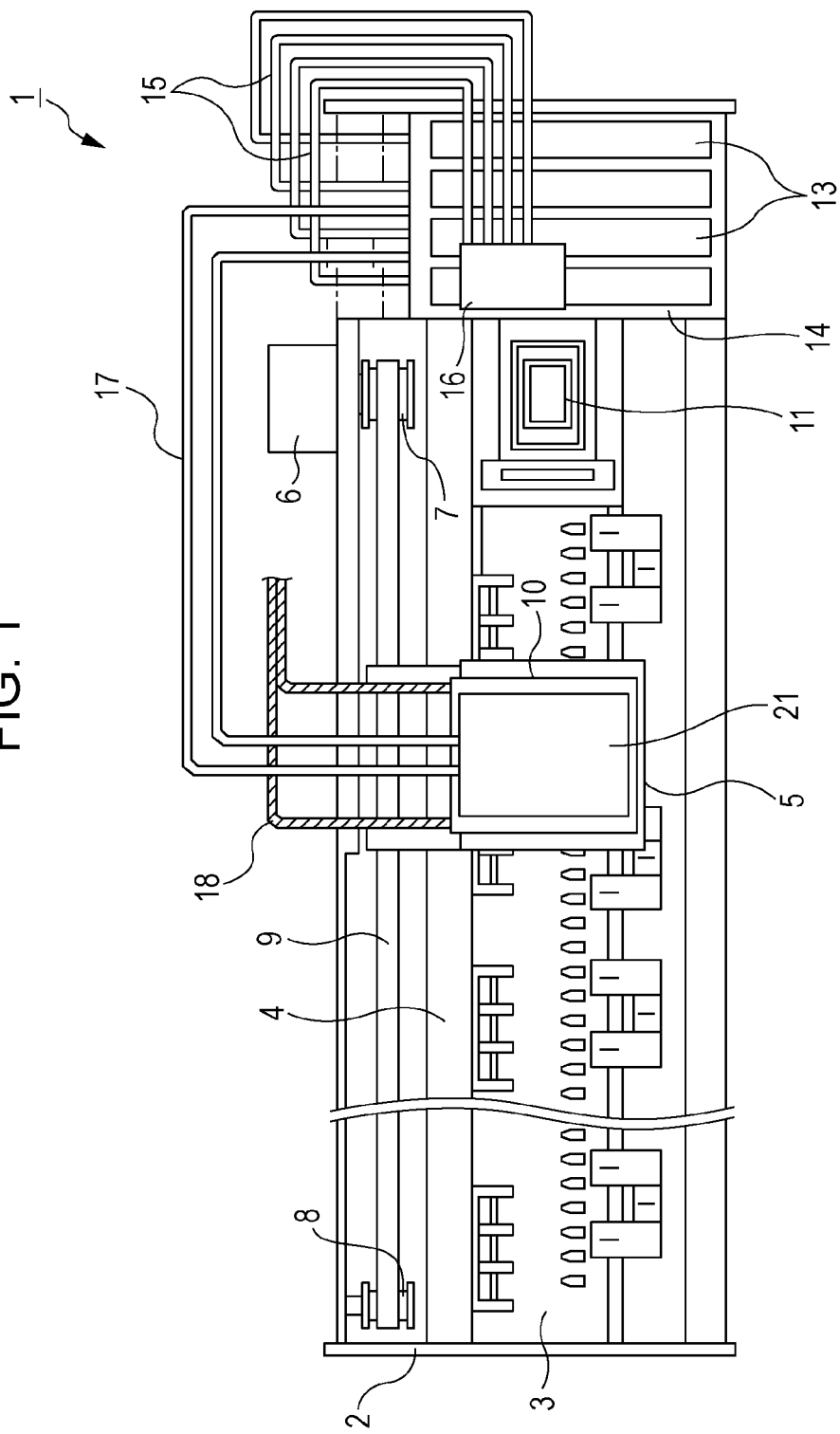
FIG. 1 is a plan view illustrating a configuration of a liquid ejecting apparatus (a printer).

FIG. 1 is a plan view illustrating a configuration of a printer 1. The printer 1 according to the embodiment is a recording apparatus configured to eject ink in a liquid form (one example of liquid in the invention) from a recording head 10 (see FIG. 2) onto a surface of a recording medium (a landing target of liquid, not illustrated), such as a recording sheet, a cloth, and a resin film, to record an image or text, for example. The printer 1 includes a frame 2 and a platen 3 disposed in the frame 2. A recording medium is transported onto the platen 3 by a transport mechanism (not illustrated). In the frame 2, a guide rod 4 is suspended in parallel with the platen 3. The guide rod 4 slidably supports a carriage 5 housing the recording head 10. The carriage 5 is configured to reciprocate in a main scanning direction intersecting a transport direction of the recording medium along the guide rod 4 by a carriage movement mechanism (not illustrated). The carriage movement mechanism includes a pulse motor 6, a drive pulley 7 configured to be rotated by the activation of the pulse motor 6, and an idler pulley 8 on the frame 2 at a side opposite the drive pulley 7, and a timing belt 9 extending across the drive pulley 7 and the idler pulley 8. The printer 1 according to the embodiment perform a recording operation (a liquid ejecting operation) by ejecting ink through a nozzle 30 of the recording head 10 (see FIG. 2) while the carriage 5 is reciprocated relative to the recording medium.

A cartridge holder 14 in which ink cartridges 13 (one example of a liquid supply source or a liquid storing container) are detachably arranged is disposed on one side of the frame 2. The ink cartridges 13 are connected to an air pump 16 through air tubes 15. Air in the air pump 16 is applied to the ink cartridges 13. The inside of each ink cartridge 13 is pressurized by the pressurized air, and thus the ink in the ink cartridge 13 is supplied (pumped) to the recording head 10 through an ink supply tube 17. The ink sent from the ink cartridge 13 through the ink supply tube 17 is introduced into a valve unit 21 in the carriage 5 first. The ink introduced into the valve unit 21 passes through a filter 55, which is described later, and is supplied to an ink flow path in the recording head 10 after the supply pressure is regulated by a pressure regulator 57. The liquid storing container is not limited to the exemplified one, and liquid storing containers of various types, such as a cartridge type, a pack type, a tank type, may be employed. Examples of the ink may include an aqueous dye ink, an aqueous pigment ink, an organic solvent based ink (an eco-solvent ink) having a higher weather resistant than the aqueous inks, a photo-curable ink, which is curable by application of ultraviolet rays, and other various inks having known compositions.

The ink supply tube 17 is a flexible hollow member formed of a synthetic resin, for example. The ink supply tube 17 has ink flow paths corresponding to the respective ink cartridges 13. Furthermore, a flexible flat cable (FFC) 18 for transmitting drive signals or the like from a controller (not illustrated) of the main body of the printer 1 toward the recording head 10 is routed between the main body of the printer 1 and the recording head 10.

On the inner side of the frame 2, a capping mechanism 11 including a cap 12 for sealing a nozzle face of the recording head 10 is disposed at a home position on one side (a side adjacent to the cartridge holder 14) in a movement region of the recording head 10. The capping mechanism 11 is configured to seal the nozzle face of the recording head 10 (the surface having the nozzles 30, which is a bottom surface of the recording head 10 constituted by a nozzle plate 24 and a fixation plate 23) with the cap 12 while the recording head 10 is in a standby mode at the home position such that evaporation of the solvent in the ink through the nozzles 30 is suppressed. Furthermore, the capping mechanism 11 is capable of performing a cleaning operation (a maintenance operation) in which, with the nozzle face of the recording head 10 being sealed, a sealed space is negatively pressurized by a suction member, such as a suction pump, such that ink and air bubbles in the nozzle are forcibly suctioned.

Figure 2:
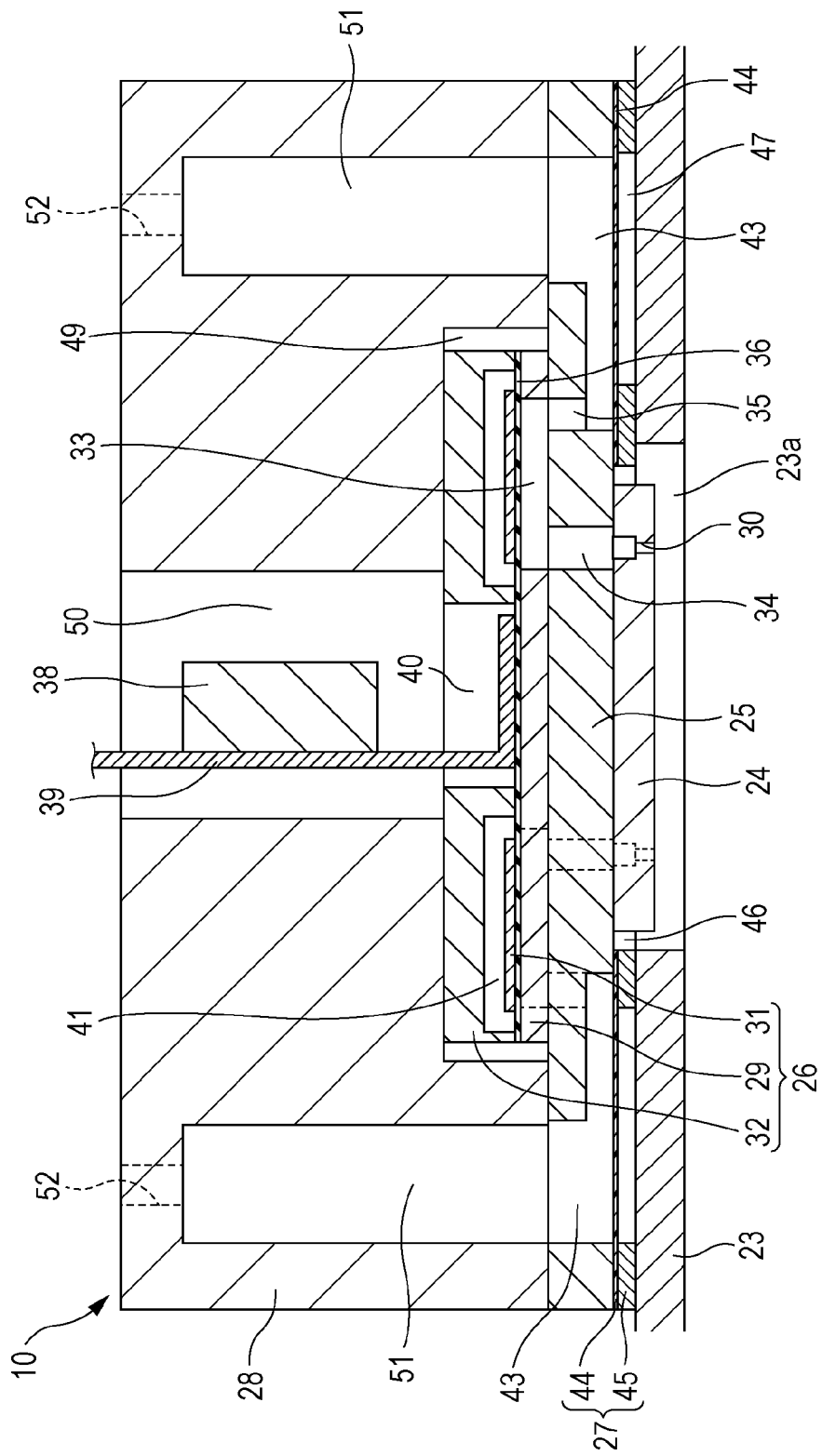
FIG. 2 is a cross-sectional view illustrating a configuration of a liquid ejecting head (a recording head).

Next, a configuration of the recording head 10 in the embodiment is described. FIG. 2 is a cross-sectional view of the recording head 10. The recording head 10 in the embodiment is a unit including a fixation plate 23, a nozzle plate 24, a communication plate 25, an actuator board 26, a compliance board 27, and a case 28, for example, stacked on each other by using an adhesive or the like. In the following description, a stacking direction in which the components of the recording head 10 are stacked is referred to as an up-down direction.

The actuator board 26 in the embodiment includes a pressure chamber formation board 29 having pressure chambers 33 in communication with the nozzles 30 in the nozzle plate 24, piezoelectric elements 31 as drive elements configured to cause pressure fluctuations in ink in the pressure chambers 33, and a protection board 32 that protects the pressure chamber formation board 29 and the piezoelectric elements 31. The pressure chamber formation board 29, the piezoelectric elements 31, and the protection board 32 are stacked on each other. The protection board 32 has a wiring cavity 40 at a substantially middle portion in plan view. A flexible board 39 having a drive IC 38 thereon is disposed in the wiring cavity 40. A lead electrode of the piezoelectric element 31 is disposed in the wiring cavity 40, and a wiring terminal of the flexible board 39 is electrically connected to the lead electrode. The flexible board 39 connected to the lead electrode of the piezoelectric element 31 is configured to supply drive signals or the like, which are transmitted from the controller through the FFC 18, to the piezoelectric element 31. The flexible board 39 is not limited to the one having the drive IC 38 thereon. The drive IC 38 may be separately disposed on an upper portion of the protection board 32, which functions as an interposer. The flexible board 39 may be one not having the drive IC 38.

The pressure chamber formation board 29 of the actuator board 26 is formed of a single crystal silicon substrate. The pressure chamber formation board 29 includes spaces as the pressure chambers 33 arranged in a line at positions corresponding to the nozzles 30. The pressure chambers 33 are hollow portions elongated in a direction intersecting the nozzle line (in this embodiment, in a direction perpendicular to the nozzle line). The pressure chamber 33 is in communication with a nozzle communication hole 34 at one end in the longitudinal direction and in communication with an individual communication hole 35 at the other end. The pressure chamber formation board 29 in this embodiment includes two lines of the pressure chambers 33.

A vibration plate 36 is disposed on an upper surface of the pressure chamber formation board 29 (a surface away from the communication plate 25). The vibration plate 36 seals the upper openings of the pressure chambers 33. The vibration plate 36 defines a portion of the pressure chambers 33. The vibration plate 36 includes an elastic film formed of silicon dioxide ($SiO_2$) on the upper surface of the pressure chamber formation board 29 and an insulating film formed of zirconium oxide ($ZrO_2$) on the elastic film, for example. The piezoelectric elements 31 are disposed on the vibration plate 36 in respective regions corresponding to the pressure chambers 33.

The piezoelectric elements 31 in the embodiment are so-called flexurally-vibrating mode piezoelectric elements. The piezoelectric element 31 includes a lower electrode layer, a piezoelectric layer, and an upper electrode layer (all of which are not illustrated) in this order on the vibration plate 36, for example. The piezoelectric element 31 having such a configuration is subjected to flexural deformation in the up-down direction when an electric field corresponding to a potential difference between the lower electrode and the upper electrode is generated between the lower electrode layer and the upper electrode layer. In this embodiment, two lines of the piezoelectric elements 31 are provided so as to correspond to the two lines of the pressure chambers 33. The lower electrode layer and the upper electrode layer extend as lead electrodes from the lines of the piezoelectric elements 31 on both sides to the wiring cavity 40 between the lines so as to be electrically connected to the flexible board 39 as described above.

The protection board 32 is disposed on the vibration plate 36 so as to cover the two lines of the piezoelectric elements 31. The protection board 32 has a long housing space 41 for housing the lines of the piezoelectric elements 31. The housing space 41 is a recess extending from the lower surface of the protection board 32 (the surface adjacent to the vibration plate 36) toward the upper surface (the surface adjacent to the case 28) by a predetermined height. The protection board 32 in the embodiment has the housing space 41 on each side of the wiring cavity 40.

The communication plate 25 having a larger area than the actuator board 26 is connected to the lower surface of the actuator board 26. The communication plate 25 is formed of a single crystal silicon substrate as the pressure chamber formation board 29. The communication plate 25 in the embodiment includes a nozzle communication hole 34 through which the pressure chamber 33 and the nozzle 30 are in communication with each other, a reservoir 43 commonly provided for the pressure chambers 33, and individual communication holes 35 through which the reservoir 43 and the pressure chambers 33 are in communication with each other. The reservoir 43 (may be referred to as a common liquid chamber or a manifold) is a cavity extending in a nozzle line direction. Two reservoirs 43 are provided in the communication plate 25 for the respective nozzle lines in the nozzle plate 24. In other words, the reservoir 43 is provided for each kind of ink. The individual communication holes 35 are arranged in the nozzle line direction so as to correspond to the pressure chambers 33. The individual communication holes 35 are each in communication with the end of the pressure chamber 33 at the other side in the longitudinal direction of the pressure chamber 33 (the side away from the nozzle communication hole 34).

The nozzle plate 24 having a plurality of nozzles 30 is connected to a substantially middle section of the lower surface of the communication plate 25. The nozzle plate 24 in the embodiment has a smaller outer shape than the communication plate 25 and the actuator board 26. The nozzle plate 24 is formed of a single crystal silicon substrate. The nozzle plate 24 is connected to the lower surface of the communication plate 25 by an adhesive, for example, at a position away from the opening of the reservoir 43 over a region where the nozzle communication holes 34 are open, such that the nozzle communication holes 34 and the corresponding nozzles 30 are in communication with each other. The nozzle plate 24 in the embodiment has two nozzle lines in which the nozzles 30 are arranged side by side.

A compliance board 27 having a through opening 46 extending along the outer shape of the nozzle plate 24 at the middle is connected to the lower surface of the communication plate 25 such that the through opening 46 surrounds the nozzle plate 24. The through opening 46 of the compliance board 27 is in communication with a through hole 23a of the fixation plate 23 and the nozzle plate 24 is placed in the through opening 46. The compliance board 27 is connected to the lower surface of the communication plate 25 at a predetermined position and seals the lower opening of the reservoir 43 of the communication plate 25. The compliance board 27 in the embodiment includes a compliance sheet 44 and a support plate 45 connected to and supporting the compliance sheet 44.

The compliance sheet 44 of the compliance board 27 is connected to the lower surface of the communication plate 25, and the compliance sheet 44 is sandwiched between the communication plate 25 and the support plate 45. The compliance sheet 44 is a flexible thin film formed of a synthetic resin material, such as polyphenylene sulfide (PPS). The support plate 45 is formed of metal having higher rigidity and larger thickness than the compliance sheet 44, such as stainless steel. A portion of the support plate 45 corresponding to the reservoir 43 is an opening having a shape corresponding to the lower opening of the reservoir 43. Thus, the lower opening of the reservoir 43 is sealed only by the flexible compliance sheet 44. In other words, the compliance sheet 44 defines a portion of the reservoir 43.

The fixation plate 23 is connected to the lower surface of the support plate 45. This forms a compliance space 47 between a flexible region of the compliance sheet 44 and the portion of the fixation plate 23 corresponding to the flexible region. The flexible region of the compliance sheet 44 corresponding to the compliance space 47 is displaced toward the reservoir 43 or toward the compliance space 47 in response to the pressure fluctuations in the ink flow path, particularly, in the reservoir 43. Thus, the thickness of the support plate 45 is determined such that the compliance space 47 has a necessary height.

The actuator board 26 and the communication plate 25 are fixed to the case 28. The case 28 has a housing cavity 49 for housing the actuator board 26 at the side adjacent to the lower surface. The lower surface of the case 28 is sealed by the communication plate 25 with the actuator board 26 being housed in the housing cavity 49. As illustrated in FIG. 2, the case 28 has an insertion cavity 50 in communication with the housing cavity 49 at a substantially middle section of the case 28 in plan view. The insertion cavity 50 is also in communication with the wiring cavity 40 of the actuator board 26. The above-described flexible board 39 is configured to be inserted into the wiring cavity 40 through the insertion cavity 50. The case 28 has a liquid chamber cavity 51 in communication with the reservoir 43 in the communication plate 25 on each side of the insertion cavity 50 or the housing cavity 49. In addition, the upper surface of the case 28 has inlets 52 in communication with the liquid chamber cavities 51. The inlets 52 are in communication with outlets 65 of the valve unit 21 through an inlet flow path in a flow path member in a holder. Thus, the ink sent from the valve unit 21 flows through the inlet 52 and the liquid chamber cavity 51 to the reservoir 43, and then the ink in the reservoir 43 is supplied to the pressure chambers 33 through the individual communication holes 35.

The fixation plate 23 is formed of metal, such as stainless steel. The fixation plate 23 in the embodiment has a through hole 23a having a shape corresponding to the outer shape of the nozzle plate 24 at a position corresponding to the nozzle plate 24 such that the nozzles 30 in the nozzle plate 24 are exposed. As described above, the through hole 23a is in communication with the through opening 46 in the compliance board 27. In this embodiment, the lower surface of the fixation plate 23 and the portion of the nozzle plate 24 exposed through the through hole 23a form a nozzle face of the invention. The fixation plate 23 is connected to the holder, which houses the case 28 to which the actuator board 26 and the communication plate 25 are fixed, by an adhesive, for example.

In the recording head 10 having the above-described configuration, when the piezoelectric element 31 is driven in accordance with the driving signals from the drive IC 38 with the flow path extending from the liquid chamber cavity 51 to the nozzle 30 through the reservoir 43 and the pressure chamber 33 being filled with the ink, the pressure fluctuations occur in the ink in the pressure chamber 33. The pressure fluctuations cause the ink to be ejected through the predetermined nozzle 30.

Figure 3:
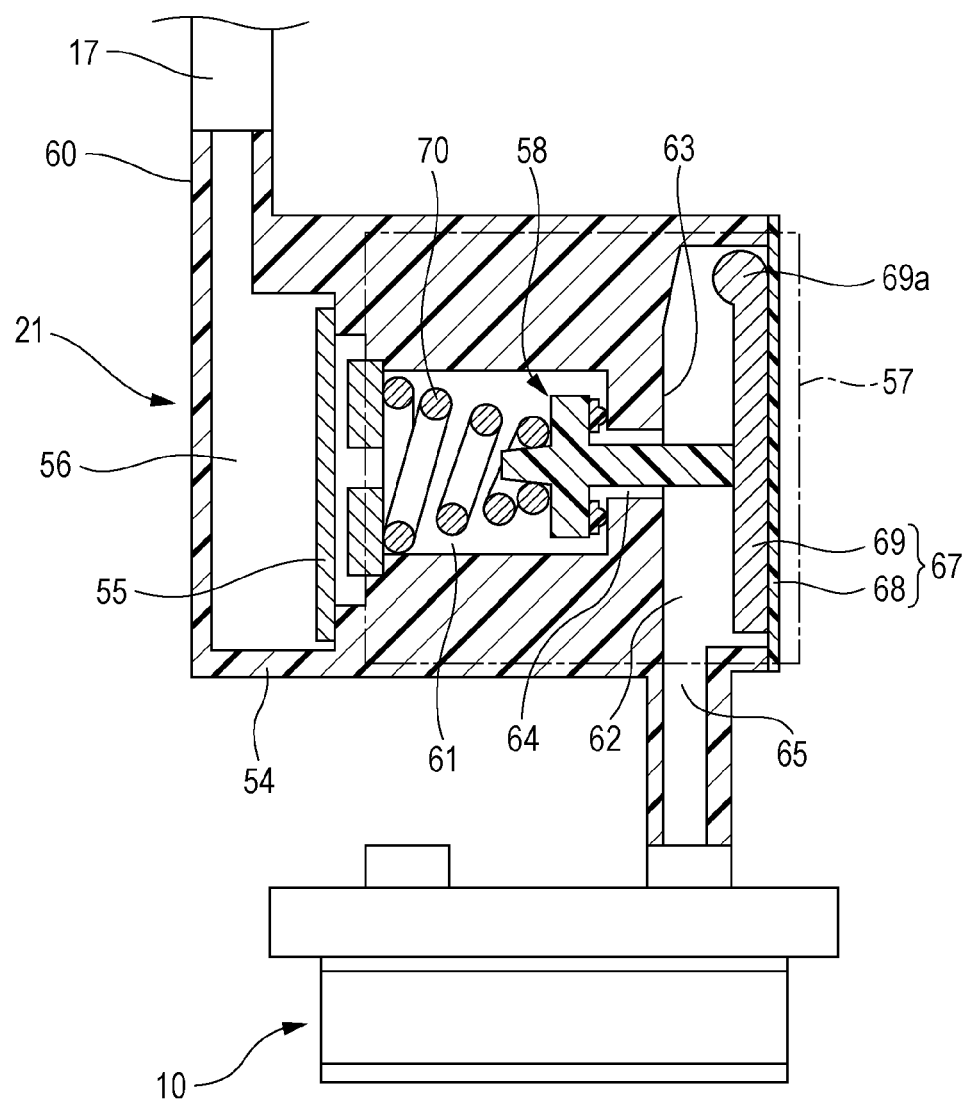
FIG. 3 is a schematic view illustrating a configuration of a valve unit.

FIG. 3 is a schematic view illustrating one example of the valve unit 21. The valve unit 21 is configured to regulate the supply pressure of the ink to be supplied from the ink cartridge 13 to the recording head 10. The valve unit 21 in this embodiment includes, in a body 54 (one example of a flow path member in the invention) formed of a synthetic resin, a filter chamber 56 having a filter 55, and a pressure regulator 57 having a pressure regulating valve 58 (one example of a valve in the invention), for example. The body 54 in the embodiment is formed of modified polyphenylene ether (modified PPE: XYRON (registered trade mark)), for example. The ink sent from the ink cartridge 13 through the ink supply tube 17 is introduced into the valve unit 21 through a flow path connection 60, first into the filter chamber 56. The filter 55 is disposed on a border between the filter chamber 56 and a valve housing chamber 61.

The pressure regulator 57 includes the valve housing chamber 61 in which the pressure regulating valve 58 is disposed, the pressure regulating chamber 62 in communication with the valve housing chamber 61, and a pressure receiving member 67 sealing an opening of the pressure regulating chamber 62, which is located at one side. The pressure regulating chamber 62 is a hollow space extending from one surface (a right side surface in FIG. 3) of the body 54 toward the other side surface (a left side surface in FIG. 3). A partition wall 63 separating the pressure regulating chamber 62 and the valve housing chamber 61 has an inlet port 64 (corresponding to a flow path opening in the invention) through which the valve housing chamber 61 and the pressure regulating chamber 62 are in communication with each other. The surface of the partition wall 63, which has the inlet port 64, adjacent to the valve housing chamber 61 functions as an opening surface in the invention. The pressure regulating chamber 62 has an outlet port 65 at the bottom, which is located downstream of the inlet port 64. In the embodiment, a flow path extending from the flow path connection 60 to the outlet port 65 through the filter chamber 56, the valve housing chamber 61, the inlet port 64, and the pressure regulating chamber 62 corresponds to a liquid flow path in the invention.

The opening of the pressure regulating chamber 62 is sealed by the pressure receiving member 67, which is in the form of diaphragm. The pressure receiving member 67 includes a flexible film member 68 and an operation piece 69 disposed inwardly from the film member 68. The film member 68 is elastically deformed to the inner side of the pressure regulating chamber 62 (toward the partition wall 63) when the pressure in the pressure regulating chamber 62 is lower than a predetermined pressure. The film member 68 includes a flexible thin resin film, for example. The film member 68 is bonded or welded onto a side surface of the body 54 so as to seal the opening of the recess, which is used as the pressure regulating chamber 62 (i.e., the opening of the pressure regulating chamber 62, which is located at one side). The film member 68 defines a portion of the pressure regulating chamber 62. The operation piece 69 is configured to turn about an end 69a thereof supported by the body 54 in accordance with the deformation of the film member 68.

Figure 4:
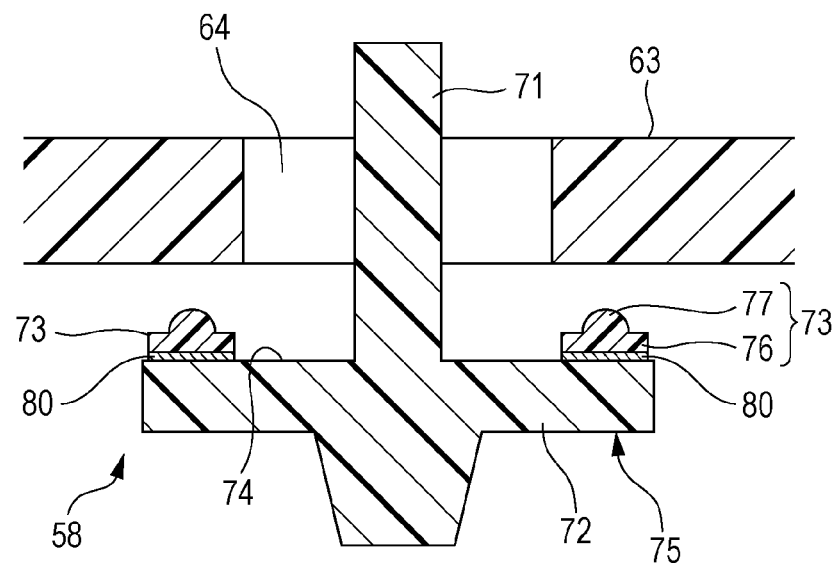
FIG. 4 is a cross-sectional view illustrating a pressure regulating valve and peripheral components thereof.
Figure 5:
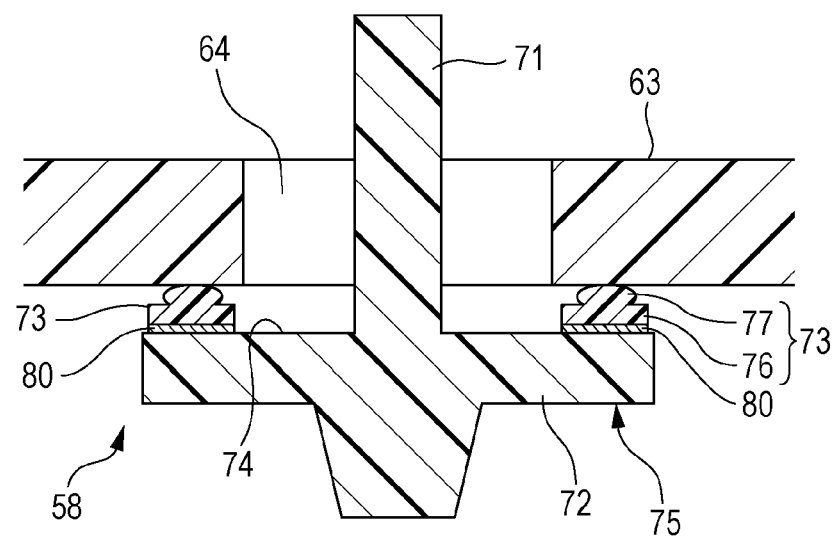
FIG. 5 is a cross-sectional view illustrating the pressure regulating valve and the peripheral components thereof.
Figure 6:
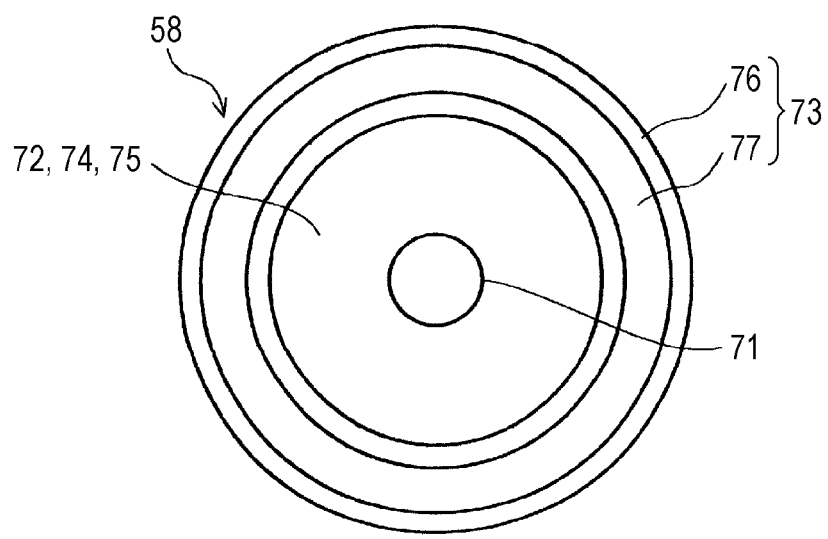
FIG. 6 is a plan view of a sealing surface of the pressure regulating valve.

FIG. 4 and FIG. 5 are cross-sectional views each illustrating the pressure regulating valve 58 and peripheral components thereof. In FIG. 4, the valve is in an open state. In FIG. 5, the valve is in a closed state. FIG. 6 is a plan view of a sealing surface 74 (a surface adjacent to the partition wall 63) of the pressure regulating valve 58. The pressure regulating valve 58 in the embodiment is configured to move forward or backward in the axial direction of a shaft 71 (described later), which comes in contact with the pressure receiving member 67, to switch the state between the valve open state, which allows the ink in the valve housing chamber 61 to flow to the pressure regulating chamber 62, and a valve closed state, which does not allow the ink in the valve housing chamber 61 to flow to the pressure regulating chamber 62. The pressure regulating valve 58 is biased toward the valve open position (toward the partition wall 63) by a biasing member 70, such as a coil spring, and the pressure regulating valve 58 in such a state is disposed in the valve housing chamber 61, which is located upstream of the partition wall 63. The pressure regulating valve 58 includes a valve body 75 and a sealing member 73.

The valve body 75 includes a cylindrical shaft 71 and a flange portion 72 extending laterally from a middle of the shaft 71. The valve body 75 is formed of a synthetic resin having higher rigidity than the sealing member 73, such as a modified PPE, as the body 54. The front end portion of the shaft 71 (a portion closer to the pressure regulating chamber 62 than the flange portion 72) has a smaller outer diameter than an inner diameter of the inlet port 64. The front end portion is inserted into the pressure regulating chamber 62 through the inlet port 64 in the partition wall 63. In the valve open state, the ink in the filter chamber 56 flows into the pressure regulating chamber 62 through the gap between the shaft 71 and the inner surface of the inlet port 64. The flange portion 72 is a disc-shaped member having an area larger than the opening area of the inlet port 64. The surface of the flange portion 72 adjacent to the partition wall 63 functions as a sealing surface 74. In the pressure regulating valve 58, the sealing surface 74 is moved forward or backward relative to the opening surface of the partition wall 63, which has the inlet port 64, to open or close the inlet port 64.

The sealing member 73 formed of an elastic material such as elastomer is disposed on a portion of the sealing surface 74 of the flange portion 72 facing a peripheral portion of the inlet port 64. As illustrated in FIG. 6, the sealing member 73 has a ring-like shape extending along the outer peripheral portion of the flange portion 72 in plan view. Furthermore, as illustrated in FIG. 4 and FIG. 5, the sealing member 73 in the embodiment integrally includes a seal base 76 having a large width in cross-sectional view and a semi-circular contact portion 77 having a smaller width than the seal base 76 in cross-sectional view. As illustrated in FIG. 5, the contact portion 77 is in close contact with the peripheral portion of the inlet port 64 in the partition wall 63 by the elasticity when the valve is closed, and thus the sealing member 73 liquid-tightly seals the peripheral portion of the inlet port 64. In other words, the sealing member 73 is in close contact with the peripheral portion of the inlet port 64 and the sealing surface 74 when the pressure regulating valve 58 is closed. The sealing member 73 is described in detail later.

The biasing member 70 comes in contact with the surface of the flange portion 72 of the pressure regulating valve 58 opposite the sealing surface 74 to bias the entire pressure regulating valve 58 toward the partition wall 63 and keeps the valve closed state until the pressure in the pressure regulating chamber 62 decreases to a predetermined pressure. In other words, the pressure regulating valve 58 is kept at the valve closed position where the sealing member 73 on the flange portion 72 is in close contact with the peripheral portion of the inlet port 64 except when a stress against the biasing force of the biasing member 70 is applied. The pressure regulating valve 58 in the valve closed state at the valve close position blocks the ink flow from the valve housing chamber 61 to the pressure regulating chamber 62.

After the ink flow to the pressure regulating chamber 62 is blocked by the pressure regulating valve 58, the pressure in the pressure regulating chamber 62 decreases as the ink is used by the recording head 10. When the pressure in the pressure regulating chamber 62 decreases to a predetermined pressure, the film member 68 of the pressure receiving member 67 is deformed to the inner side of the pressure regulating chamber by the atmospheric pressure to push the operation piece 69 toward the partition wall 63 (toward the pressure regulating valve 58). Thus, the operation piece 69 pushes the end of the shaft 71 of the pressure regulating valve 58 at the valve closed position such that the pressure regulating valve 58 moves against the elastic force of the biasing member 70 in an opening direction (to the side away from the partition wall 63). As illustrated in FIG. 4, this moves the sealing member 73 on the flange portion 72 away from the opening surface of the partition wall 63 such that the pressure regulating valve 58 moves to a position (a valve open position) where the close contact state is cancelled.

In the valve open state, the ink in the valve housing chamber 61 is allowed to flow into the pressure regulating chamber 62 through the inlet port 64. The ink flowed into the pressure regulating chamber 62 is supplied to the ink flow path in the recording head 10 through the outlet port 65.

After the valve is open, the pressure in the pressure regulating chamber 62 gradually increases as the ink flows into the pressure regulating chamber 62. The increase in the pressure in the pressure regulating chamber 62 causes the pressure receiving member 67 to gradually move toward the side away from the partition wall 63 (the pressure regulating valve 58). At the end, the pressure regulating valve 58 is moved to the valve close position by the biasing force of the biasing member 70, and thus the sealing member 73 on the flange portion 72 is in close contact with the peripheral portion of the inlet port 64 to close the inlet port 64. Thus, the ink flow into the pressure regulating chamber 62 is blocked.

Next, the sealing member 73 is described. The sealing member 73 in the embodiment is formed of a resin having liquid-repellent properties and elasticity. Specific examples thereof include a fluorinated elastomer having a fluorinated polyether backbone. The fluorinated elastomer is preferably used as the sealing member 73, because the fluorinated elastomer has liquid-repellent properties and elasticity (flexibility), and further has heat resistance and chemical stability, which allow the properties to be maintained for a long-time period. Examples of the fluorinated elastomer include a fluorinated silicone resin having a hydrosilyl group (silicon-hydrogen bond) and a hydrocarbon group (e.g., an alkenyl group such as a vinyl group having a carbon-carbon double bond) and having a fluorinated polyether backbone. An organic solvent based ink may be used as ink in the printer 1. In such a case, the conventional sealing member formed of a styrene elastomer or an olefin elastomer is swollen by the ink, lowering the connection strength between the sealing member and the valve body. Thus, the sealing member may be detached from the valve body. In the printer 1 according to the invention, the above-described problem is overcome by the employment of the sealing member 73 formed of a fluorinated elastomer and the primer layer 80 formed between the sealing member 73 and the valve body 75. This is described below.

Figure 7:
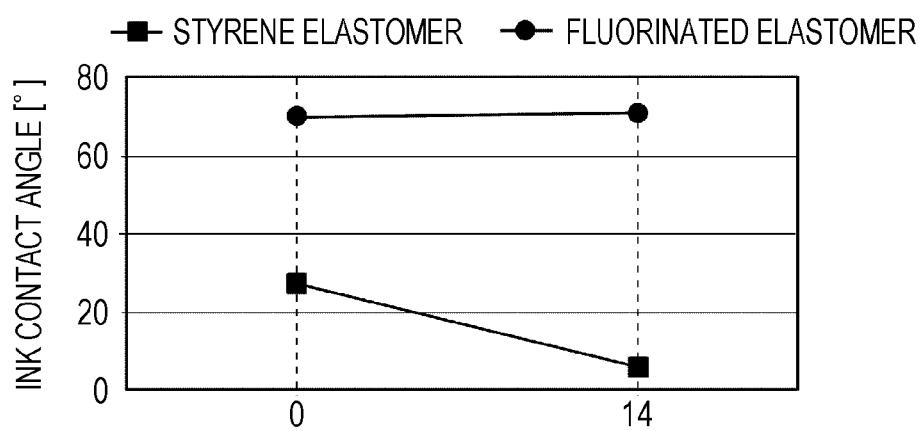
FIG. 7 is a graph indicating a contact angle of a sealing member immersed in an organic solvent based ink.

FIG. 7 is a graph indicating changes in contact angles (static contact angles) measured when a sealing member formed of a styrene elastomer and a sealing member formed of a fluorinated elastomer are each immersed into an organic solvent based ink heated to a temperature of 60° C. The contact angles measured before the immersion (0 day) and the contact angles measured after 14 days are plotted. As indicated in FIG. 7, in the case of the styrene elastomer, the contact angle decreases with time during the immersion. In the case of the fluorinated elastomer, the contact angle is larger than the styrene elastomer, and the contact angle stays about the same during the immersion. As can be seen from this, the sealing member 73 in the embodiment has resistance to the organic solvent based ink, i.e., high liquid-repellent properties, and thus the sealing member 73 is less likely to be swollen by the ink. Thus, when the organic solvent based ink is used, the sealing member 73 is less likely to be detached from the valve body 75 due to the swelling. Furthermore, the liquid-repellent properties are maintained for a long-time period, reducing accumulation of substances contained in the ink on the sealing member 73. This reduces a decrease in the sealing properties possibly caused by the accumulated substances. Furthermore, in the embodiment, the primer layer 80 is disposed between the sealing member 73 and the valve body 75 to increase the connection strength therebetween.

Figure 8:
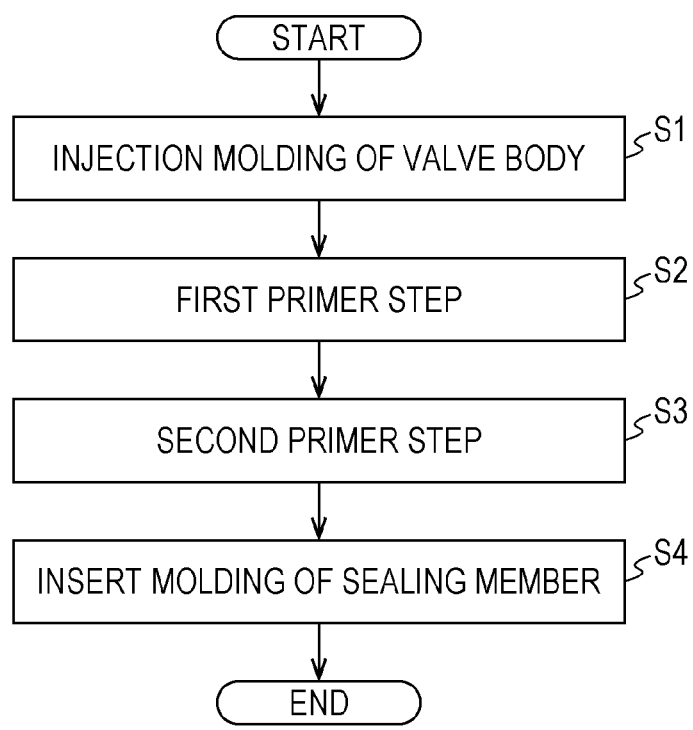
FIG. 8 is a flow chart indicating a process of producing a valve unit.
Figure 9:
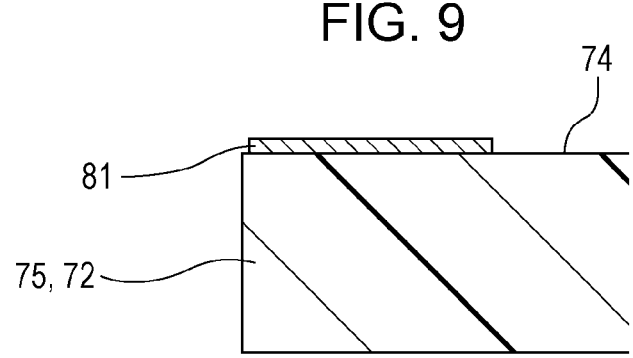
FIG. 9 illustrates a step of producing a valve unit.
Figure 10:
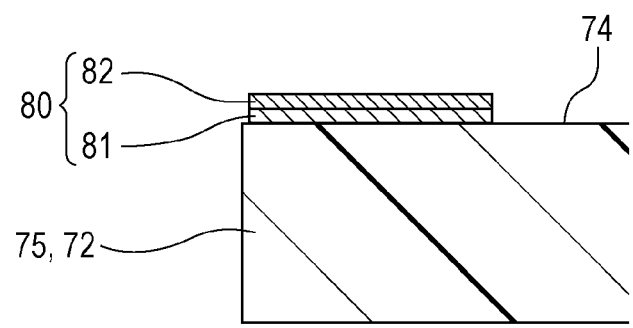
FIG. 10 illustrates a step of producing a valve unit.
Figure 11:
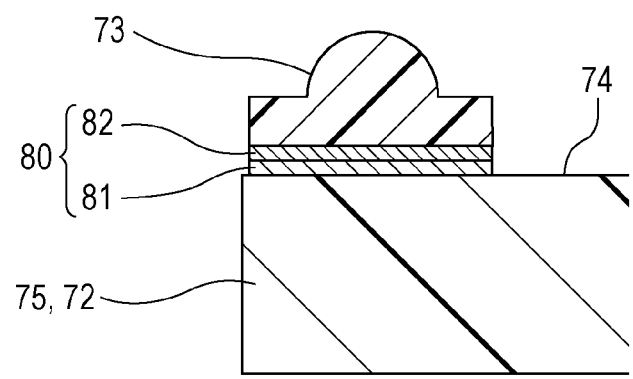
FIG. 11 illustrates a step of producing a valve unit.

Next, steps (a method) of producing the pressure regulating valve 58 according to the invention is described. FIG. 8 is a flow chart for explaining steps of producing the valve unit 21, which are included in the steps of producing the printer 1 or the recording head 10. FIG. 9 to FIG. 11 are views illustrating a primer step (a step of forming the primer layer 80). In the steps of producing the pressure regulating valve 58 according to the invention, insert molding is employed to integrally form the sealing member 73 on the valve body 75. This allows a primer step (primer treatment) to be performed to form the primer layer 80 between the valve body 75 and the sealing member 73. Thus, the connection strength between the valve body 75 and the sealing member 73 increases.

First, the valve body 75 is formed by injection molding (step S1). In an injection molding apparatus, modified PPE as a material of the valve body 75 is heated and melted to be ejected into a mold. Then, the material is shaped into the valve body 75 through a cooling step. Subsequently, primer treatment is performed on the base member of the sealing surface 74 of the valve body 75 over at least a portion where the sealing member 73 is formed (hereinafter, referred to as a sealing member arrangement portion), i.e., the primer treatment is performed on the valve body 75 in the embodiment, to form the primer layer 80 between the valve body 75 and the sealing member 73 (the primer step). This increases the bonding strength between the valve body 75 and the sealing member 73. The primer step in the embodiment includes a first primer step (step S2) and a second primer step (step S3), which use two different types of primer solutions (primer treatment solutions). In the first primer step, a first primer solution including a silane coupling agent having a functional group reactive to the base member of the sealing member arrangement portion and a functional group to be bonded to a second primer layer 82, which is described later. More specifically described, the first primer solution includes a silane coupling agent having a hydrolyzable group (for example, an alkoxy group such as a methoxy group) to be chemically bonded to a hydroxyl group (OH group) derived from silica contained as a filler in the material of the valve body 75 (the modified PPE in this embodiment) and a hydrocarbon group to be bonded to the second primer layer 82 (for example, an alkenyl group such as a vinyl group having a carbon-carbon double bond).

In the first primer step, the first primer solution is at least applied with a brush or the like or sprayed to the sealing member arrangement portion of the sealing surface 74 of the valve body 75 where the sealing member 73 is to be formed. In other words, in the first primer step, the surface of the sealing member arrangement portion is treated with molecules having silicon-hydroxyl group bonds and carbon-carbon double bonds. In this way, the primer layer 80 (81, 82) is selectively formed on the sealing member arrangement portion by the application or spraying of the primer solution (the first primer solution and the second primer solution, which is described later). Then, the primer solution is left untouched at a room temperature for about a dozen to tens of minutes to be dried (dried by air), and then heated by a temperature of 100° C. or more and 200° C. or less for about a dozen to tens of minutes. In this step, the first primer solution is hydrolyzed and bonded with hydroxyl groups in the sealing member arrangement portion of the valve body 75 to form a film containing siloxane bonds (polysiloxane), and then the film is subjected to the dehydration condensation reaction through heating and drying. Thus, the first primer layer 81 is formed on the sealing member arrangement portion of the valve body 75, as illustrated in FIG. 9. Thus, the siloxane bond (Si—O bond) is formed between the sealing member arrangement portion of the valve body 75 and the first primer layer 81. The bond energy of the siloxane bond is larger than the bond energy of the carbon bond and is stable, providing higher connection strength.

In the second primer step after the first primer step, a second primer solution containing a polymer component of the material of the sealing member 73 and a functional group reactive to each of the material of the sealing member 73 and the first primer layer 81 (a hydrosilyl group and a hydrocarbon group such as a vinyl group), for example. In other words, the second primer solution includes more hydrosilyl groups and more hydrocarbon groups in order to bond with each of the first primer layer 81 and the sealing member 73. In the second primer step, the second primer solution is applied or sprayed onto the portion where the first primer layer 81 is formed. In other words, in the second primer step, the sealing member arrangement portion, which has been subjected to a surface treatment in the first primer step (on which the first primer layer 81 has been formed), is further subjected to a surface treatment with molecules having hydrosilyl groups and carbon-carbon double bonds. Then, the second primer solution is left untouched at a room temperature for about a dozen to tens of minutes to be dried, and then heated by a temperature of 100° C. or more and 170° C. or less for about a dozen to tens of minutes. Thus, as illustrated in FIG. 10, the second primer layer 82 is formed on the first primer layer 81. The hydrosilyl group in the second primer layer 82 and the hydrocarbon group in the first primer layer 81 react to each other to form a siloxane bond and a carbon-carbon double bond. Thus, the first and second primer layers 81 and 82 are bonded to each other to form the primer layer 80.

Then, the sealing member 73 is disposed on the primer layer 80 by the insert molding, and thus the sealing member 73 is integrally formed on the valve body 75 as illustrated in FIG. 11 (step S4). The valve body 75 having the primer layer 80 on the portion where the sealing member 73 is to be formed is placed in a metal mold for insert molding (not illustrated). In this state, a material of the sealing member 73 in a liquid form (fluorinated elastomer) is injected into the metal mold and the sealing member 73 is cured through a heating process. In this step, the hydrosilyl groups in the sealing member 73 and the hydrocarbon groups in the second primer layer 82 react to each other, and the hydrocarbon groups in the sealing member 73 and the hydrosilyl groups in the second primer layer 82 react to each other. Thus, the sealing member 73 and the primer layer 80 (the second primer layer 82) are strongly bonded to each other. The connection to the sealing member 73 requires a relatively large amount of carbon-carbon double bonds. Thus, the second primer layer 82 has more carbon-carbon double bonds than the first primer layer 81. In the primer layer 80 between the valve body 75 and the sealing member 73, more carbon-carbon double bonds are present at the side adjacent to the sealing member 73. This further increases the bonding strength between the primer layer 80 and the sealing member 73.

The pressure regulating valve 58 integrally including the valve body 75 and the sealing member 73 is obtained through the above-described steps. As the above, the first primer layer 81, which reacts with the material (the base member of the sealing member arrangement portion) of the valve body 75 and the second primer layer 82, which reacts with the material of the first primer layer 81 and the sealing member 73, i.e., the total of two primer layers 80, are formed on the sealing member arrangement portion of the valve body 75. This enables integral formation of the valve body 75 and the sealing member 73 and increases the connection strength therebetween. Furthermore, since the sealing member 73 includes a fluorinated polyether, the sealing member 73 exhibits high liquid-repellent properties to liquid such as ink, particularly to organic solvent based ink. Thus, the sealing member 73 is less likely to be swollen by any kinds of liquid, and thus the sealing member 73 is less likely to be detached from the valve body 75. This leads to an improvement in sealing properties and durability of the pressure regulating valve 58.

Furthermore, since the sealing member 73 exhibits high liquid-repellent properties to the ink, the substances contained in the ink are less likely to be accumulated on the sealing member 73, reducing a decrease in the sealing properties. In the embodiment, since the pressure regulating valve 58, which integrally includes the valve body 75 and the sealing member 73, is produced by the insert molding, the primer treatment is able to be performed on the sealing member arrangement portion of the valve body 75. Thus, the connection strength between the valve body 75 and the sealing member 73 is further increased without requiring an apparatus having a complex structure.

As described above, in the valve unit 21 according to the invention, sealing properties and durability of the pressure regulating valve 58 are improved. In the printer 1 or the recording head 10 including the valve unit 21, since the pressure regulating valve 58 has higher durability, the printer 1 or the recoding head 10 has higher reliability.

Figure 12:
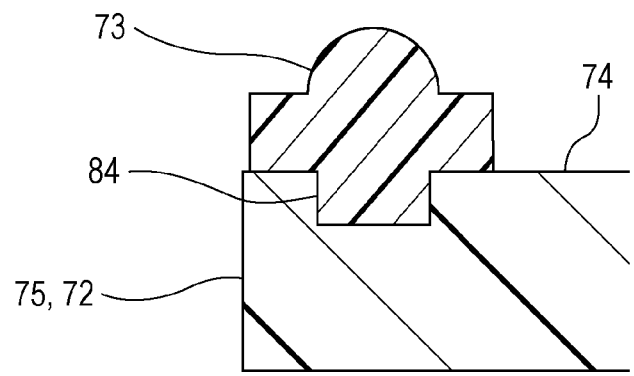
FIG. 12 is a cross-sectional view of a sealing member of a valve unit according to a second embodiment and components around the sealing member.

Next, other embodiments of the valve unit 21 are described. FIG. 12 is a cross-sectional view illustrating the sealing member 73 of the valve unit 21 according to a second embodiment and peripheral components thereof. In the first embodiment, the connection strength between the sealing member 73 and the valve body 75 is chemically increased by the primer layer 80 between the sealing member 73 and the valve body 75. However, the invention is not limited to such a configuration, and the primer layer 80 may be eliminated. In the second embodiment illustrated in FIG. 12, a recess 84 is formed in the sealing member arrangement portion of the valve body 75, which is a base member of the sealing member 73, so as to extend from the sealing member arrangement portion (the sealing surface 74) toward the side away from the sealing member arrangement portion. The recess 84 is a groove-like recess extending in the extending direction of the sealing member 73 and is smaller in width than the sealing member 73. A portion of the sealing member 73 on the sealing member arrangement portion is positioned in the recess 84. The portion of the sealing member 73 in the recess 84 functions as an anchor, physically increasing the connection strength between the sealing member 73 and the valve body 75. Thus, in the second embodiment, the sealing member 73 is less likely to be detached from the valve body 75. The other configurations of the second embodiment are the same as those in the first embodiment.

Figure 13:
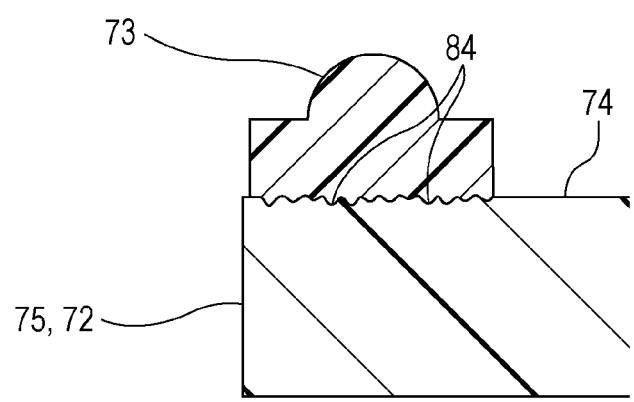
FIG. 13 is a cross-sectional view of a sealing member according to a modification of the second embodiment and components around the sealing member.

FIG. 13 is a cross-sectional view illustrating the sealing member 73 of the valve unit 21 according to a modification of the second embodiment and peripheral components thereof. The number of recesses 84 and the shape of recess 84 in the second embodiment are not limited to those illustrated in FIG. 12. For example, as illustrated in FIG. 13, many fine recesses 84 may be formed by surface roughening on the sealing member arrangement portion. In the modification, portions of the sealing member 73 positioned in the fine recesses 84 function as anchors, increasing the connection strength between the sealing member 73 and the valve body 75. The other configurations of the modification are the same as those in the second embodiment.

Figure 14:
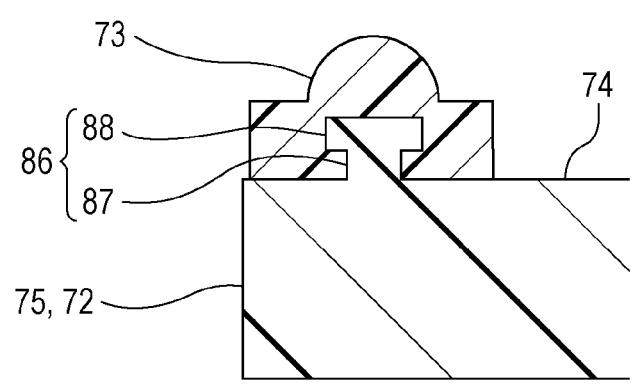
FIG. 14 is a cross-sectional view of a sealing member of a valve unit according to a third embodiment and components around the sealing member.

FIG. 14 is a cross-sectional view illustrating the sealing member 73 of the valve unit 21 according to a third embodiment and peripheral components thereof. In this embodiment, a protrusion 86 extends upwardly from the sealing member arrangement portion of the valve body 75. The protrusion 86 has a T-like shape in cross section. The protrusion 86 includes a riverbank-like (rib-like) protrusion base 87 extending in the extending direction of the sealing member 73 (corresponding to a base in the invention) and an overhanging portion 88 on the end of the protrusion base 87. The overhanging portion 88 has a larger width than the protrusion base 87. The sealing member 73 is disposed on the sealing member arrangement portion so as to cover the protrusion 86. In this configuration, the overhanging portion 88 of the protrusion 86 functions as a retainer for the sealing member 73, physically increasing the connection strength between the sealing member 73 and the valve body 75. Thus, the sealing member 73 is less likely to be detached form the valve body 75. The other configurations of the third embodiment are the same as those in the first embodiment.

As the first embodiment, in the configuration having the recess 84 or the configuration having the protrusion 86, the primer layer 80 may be disposed between the sealing member arrangement portion of the valve body 75 and the sealing member 73. This further increases the connection strength between the sealing member 73 and the valve body 75. Thus, the sealing member 73 is more reliably less likely to be detached from the valve body 75.

Figure 15:
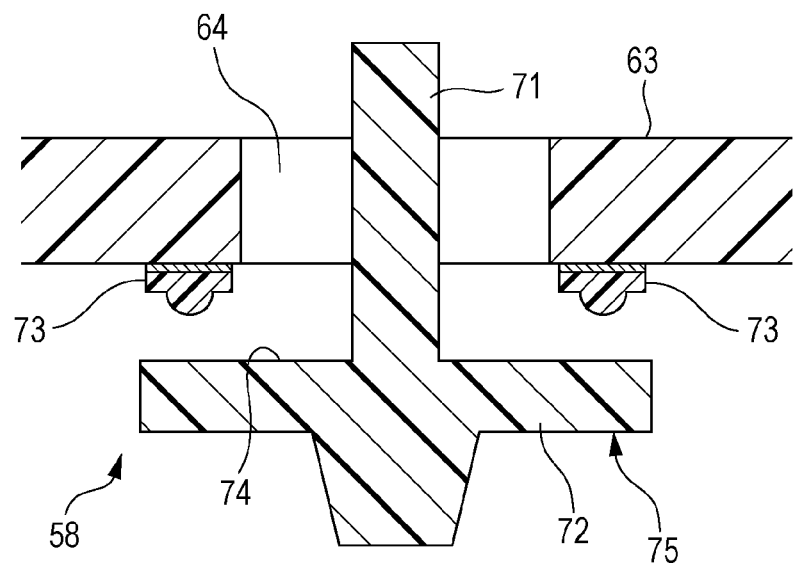
FIG. 15 is a cross-sectional view illustrating a pressure regulating valve of a valve unit according to a fourth embodiment and components around the pressure regulating valve.
Figure 16:
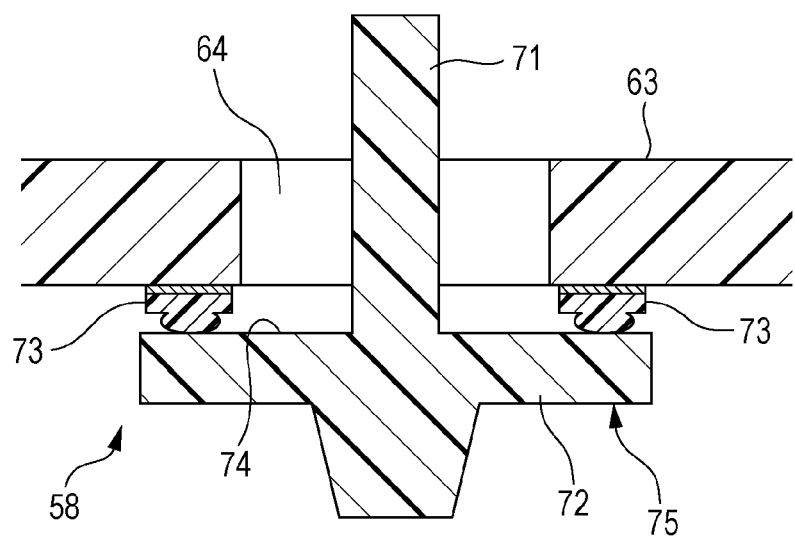
FIG. 16 is a cross-sectional view illustrating the pressure regulating valve of the valve unit according to the fourth embodiment and components around the pressure regulating valve.

FIG. 15 and FIG. 16 are cross-sectional views illustrating the pressure regulating valve 58 according to a fourth embodiment and peripheral components thereof. In FIG. 15, the valve is in an open state. In FIG. 16, the valve is in a closed state. In the above-described embodiments, the sealing member 73 is disposed on the valve body 75, but the invention is not limited to this configuration. The sealing member 73 may be disposed on a peripheral portion of the inlet port 64 in the partition wall 63 of the body 54. In this configuration, the body 54 (the partition wall 63) corresponds to a base member of the portion where the sealing member 73 is disposed (the sealing member arrangement portion). This configuration has the same advantages as the configuration including the sealing member 73 on the valve body 75. Furthermore, as in the above-described embodiments, the primer layer 80 may be disposed between the sealing member 73 and the sealing member arrangement portion, which is located at the peripheral portion of the inlet port 64 in the partition wall 63, or the recess 84 or the protrusion 86 may be formed in the sealing member arrangement portion, to increase the connection strength between the sealing member 73 and the partition wall 63.

The material of the valve body 75 or the material of the partition wall 63 (the body 54), i.e., the material of the base member of the portion where the sealing member 73 is formed, is not limited to the modified PPE, which is exemplified in the above-described embodiments. The base member of the portion where the sealing member 73 is formed may be formed of any material that has endurance for repeated open-close operations of the pressure regulating valve 58 and allows a hydroxyl group to be contained at least in the sealing member arrangement portion where the sealing member is disposed.

In the above-described embodiments, the valve unit 21 is a separate member from the recoding head 10, but the invention is not limited to this configuration. A liquid ejecting head itself may include a valve unit according to the invention (the liquid ejecting head functions as the valve unit according to the invention).

In the above-described embodiments, the valve unit 21 configured to supply ink to the recording head 10, which is one example of the liquid ejecting head, is described as an example of a valve unit. However, the invention is not limited to this configuration. The valve unit according to the invention may be used to open and close openings of liquid flow paths for other kinds of liquid.

The entire disclosure of Japanese Patent Application No. 2017-058699, filed Mar. 24, 2017 is expressly incorporated by reference herein.

What is claimed is:

1. A valve unit comprising:
    a flow path member having an opening surface that has a flow path opening of a liquid flow path;
    a valve having a sealing surface configured to seal the flow path opening, the sealing surface being configured to be moved forward and backward relative to the opening surface to open and close the flow path opening; and
    a sealing member disposed on one of a peripheral portion of the flow path opening in the opening surface and a portion of the sealing surface facing the peripheral portion, the sealing member being configured to be in contact with the peripheral portion of the flow path opening and the sealing surface when the valve is closed, wherein
    the sealing member includes a fluorinated elastomer with a fluorinated polyether backbone.

2. The valve unit according to claim 1, further comprising a primer layer between a base member of the portion where the sealing member is disposed and the sealing member.

3. The valve unit according to claim 2, wherein the base member contains a hydroxyl group, and
    the primer layer has silicon-hydroxyl group bonds and carbon-carbon double bonds.

4. The valve unit according to claim 3, wherein the carbon-carbon double bonds in the primer layer are present in a larger amount at a position adjacent to the sealing member including silicon-hydrogen bonds and carbon-carbon double bonds.

5. The valve unit according to claim 2, wherein the base member has a recess at a sealing member arrangement portion where the sealing member is disposed, and a portion of the sealing member is positioned in the recess.

6. The valve unit according to claim 2, further comprising a protrusion on a sealing member arrangement portion of the base member where the sealing member is disposed, the protrusion having a base extending upward from the sealing member arrangement portion and an overhanging portion having a larger width than the base, and
    the sealing member covers the protrusion.

7. A liquid ejecting head comprising the valve unit according to claim 1, wherein the liquid ejecting head is configured to eject liquid supplied from the valve unit.

8. A liquid ejecting head comprising the valve unit according to claim 2, wherein the liquid ejecting head is configured to eject liquid supplied from the valve unit.

9. A liquid ejecting head comprising the valve unit according to claim 3, wherein the liquid ejecting head is configured to eject liquid supplied from the valve unit.

10. A liquid ejecting head comprising the valve unit according to claim 4, wherein the liquid ejecting head is configured to eject liquid supplied from the valve unit.

11. A liquid ejecting head comprising the valve unit according to claim 5, wherein the liquid ejecting head is configured to eject liquid supplied from the valve unit.

12. A liquid ejecting head comprising the valve unit according to claim 6, wherein the liquid ejecting head is configured to eject liquid supplied from the valve unit.

13. A liquid ejecting apparatus comprising:
    the valve unit according to claim 1, and
    a liquid ejecting head configured to eject liquid supplied from the valve unit.

14. A liquid ejecting apparatus comprising:
    the valve unit according to claim 2, and
    a liquid ejecting head configured to eject liquid supplied from the valve unit.

* * * * *